Dec. 3, 1963 W. H. PRICE 3,112,596
ROTARY MOWER CLEANSING MEANS
Filed Sept. 24, 1962 3 Sheets-Sheet 1

INVENTOR.
WARREN H. PRICE
BY
Lieber & Nilles
ATTORNEYS

INVENTOR.
WARREN H. PRICE
BY
Lieber & Nilles

Dec. 3, 1963 W. H. PRICE 3,112,596
ROTARY MOWER CLEANSING MEANS
Filed Sept. 24, 1962 3 Sheets-Sheet 3

INVENTOR.
WARREN H. PRICE
BY
Lieber & Nilles

United States Patent Office 3,112,596
Patented Dec. 3, 1963

3,112,596
ROTARY MOWER CLEANSING MEANS
Warren H. Price, South Milwaukee, Wis., assignor to Jacobsen Manufacturing Company, Racine, Wis., a corporation of Wisconsin
Filed Sept. 24, 1962, Ser. No. 225,701
6 Claims. (Cl. 56—25.4)

This invention relates generally to rotary power lawn mowers of the type having an enclosed housing in which cutting blades revolve at high speeds in a horizontal plane.

In mowers of this type, the clippings are forcibly ejected from the housing through a discharge outlet and preferably without any recirculation which would tend to cause accumulation of the clippings within the housing and consequent overloading and inefficient operation thereof.

Housings of this general character have employed inverted channel passages of the volute type to promote positive pick-up and smooth flow of the clippings around the interior of the housing, and positive ejection of the clippings from the housing.

In order for housings of this character to continue to function efficiently, the interior thereof must be kept clean, that is, free of any build-up or accumulation of clippings, dirt, or other foreign matter. Such build-up and compaction of material within the housing has been particularly troublesome when operating in wet grass which adheres to almost anything it comes into contact with.

Accumulation of material within the housing overloads the mower, and generally blocks or reduces the area of the discharge opening. As a result, it is necessary to stop the mower, turn it over, and manually scrape the material from the various parts. This material must also be cleaned from the mower immediately after use and before storage, because this material dries into a hard mass that is then particularly difficult to remove.

One attempt to solve the general problem above mentioned is shown in the U.S. Patent No. 2,936,563, issued on May 17, 1960, to W. S. Blume. In that device, a conduit fitting is used to attach a water hose to and direct it into the housing. This attaching and detaching procedure, however, has proved to be a considerable task, particularly in view of the frequency required of this procedure.

In accordance with the present invention, an aperture has been provided in a mower housing having a generally circular path channel and which aperture is so located relative to the direction of movement of the material and air current within the housing that thorough cleaning and purging of the interior of the housing and all parts located therein is accomplished without the necessity of physically connecting the water supply conduit to the housing. Instead, with the present invention, the water need merely be directed to the general area of the aperture located on top of the housing, and because of the aperture's location directly in the intake side or at the beginning of the channel passage, the water is positively sucked through the aperture by a strong intake action of the rotating blades and without the necessity of the operator stopping the machine or even coming relatively close to it.

More particularly, the above-mentioned aperture is located at the beginning of the volute channel and closely adjacent to the discharge baffle which separates the beginning of the channel from its discharge end. At this particular location, there is an efficient and strong intake current which sucks the water into the housing, throws it on top of the cutting blades and their mounting, and the water is then directed completely against the interior of the tunnel including the top side thereof and entirely around the tunnel or channel to effect an efficient purging and cleansing action.

Another aspect of the present invention relates to a rotary mower housing having an aperture for the introduction of water for cleaning purposes, which housing also has on the top deck thereof a drain gutter cooperating with said aperture to drain any water from the top of the mower housing and prevent any accumulation of water on the mower.

These and other objects and advantages of the present invention will appear hereinafter as this disclosure progresses, reference being had to the accompanying drawings, in which.

Figure 1:
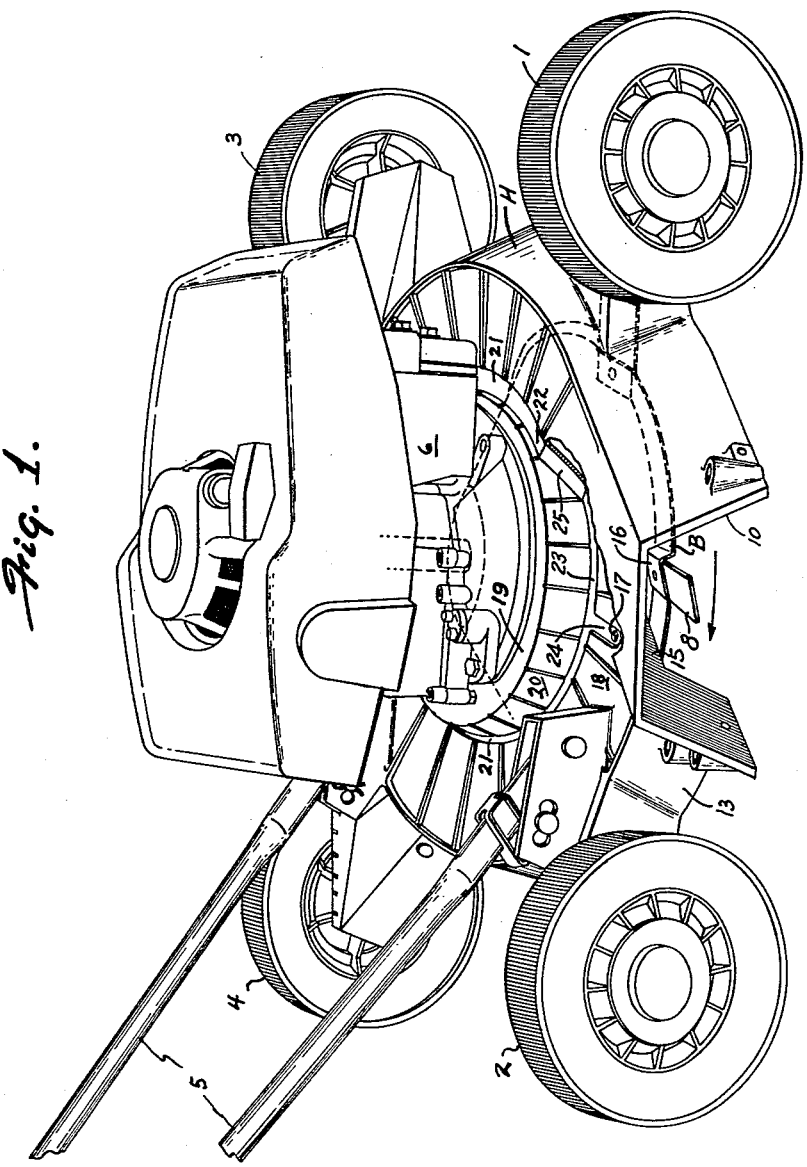
FIGURE 1 is a perspective view of a mower embodying the present invention, certain parts being broken away, or removed for clarity.
Figure 2:
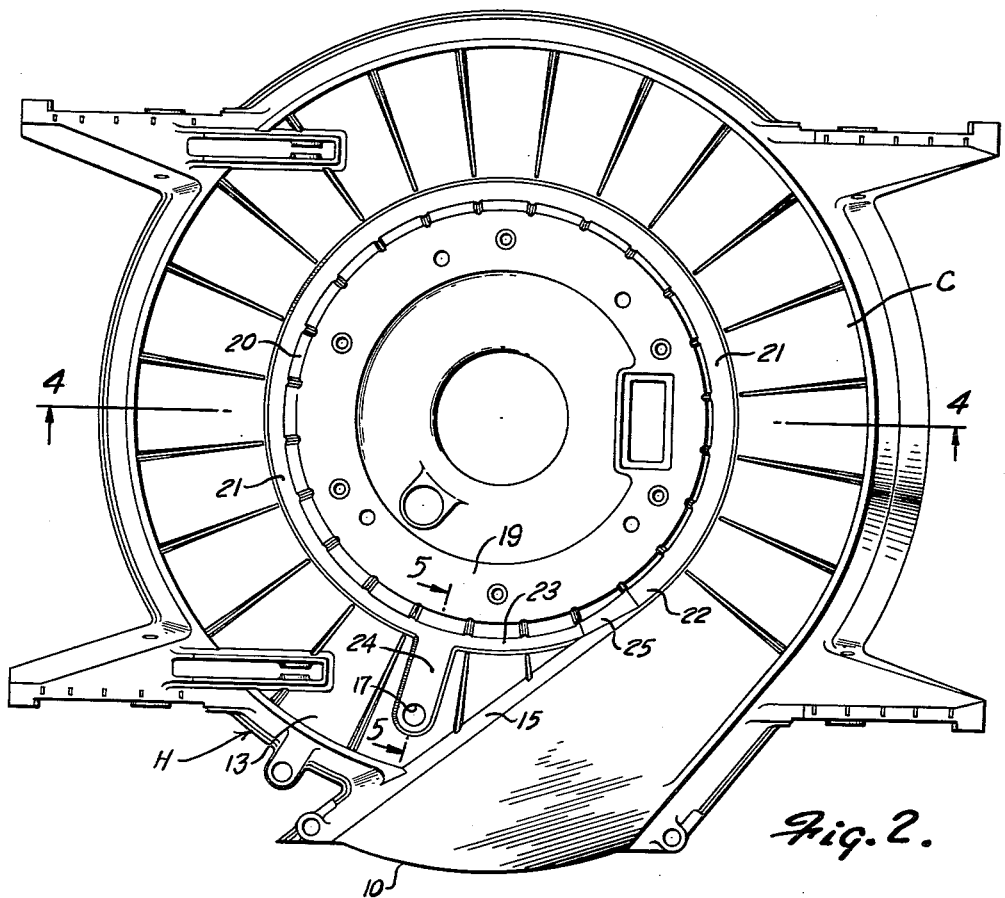
FIGURE 2 is a plan view of a portion of the mower shown in FIGURE 1.
Figure 4:
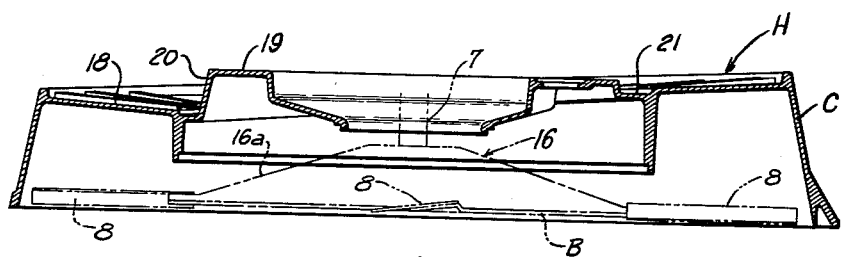
FIGURE 4 is a side elevational view, insection, taken along line 4—4 in FIGURE 2.
Figure 3:
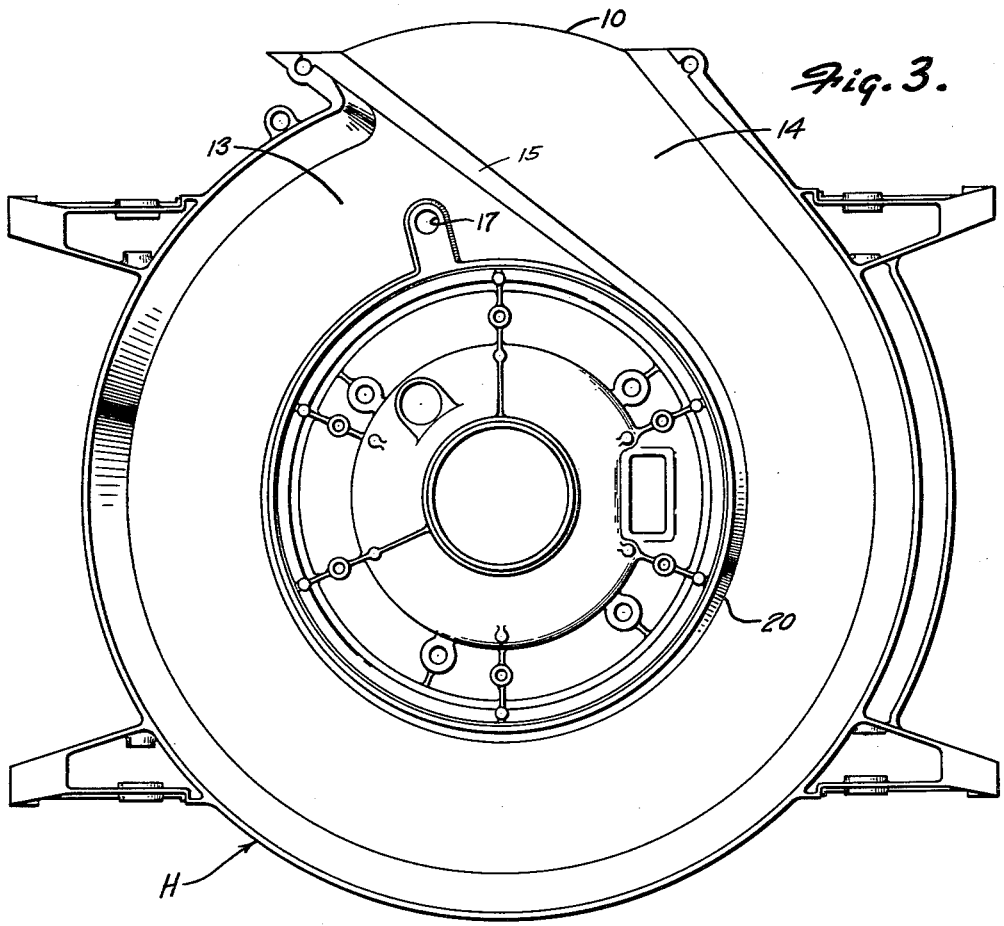
FIGURE 3 is a bottom view of the mower housing shown in FIGURE 1.
Figure 5:
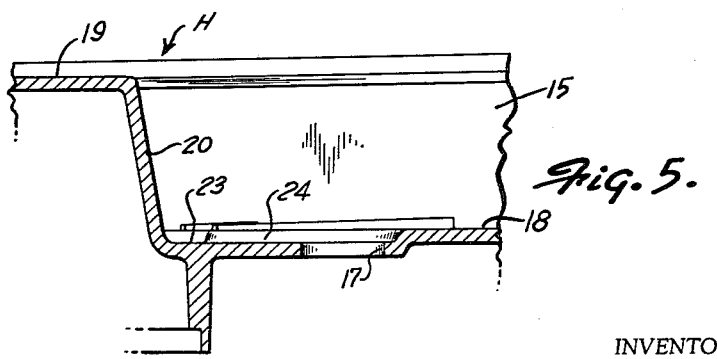
FIGURE 5 is a fragmentary, sectional view taken along line 5—5 in FIGURE 2, but on an enlarged scale.

Referring in greater detail to the drawings, the general structure of the mower comprises a housing H having ground engaging wheels 1, 2, 3, and 4 which support the housing at a constant attitude to the ground, a rearwardly extending operator's handle 5, and an internal combustion engine 6 mounted centrally on top of the housing and having a vertical drive shaft 7 extending downwardly into the housing.

The mower shown for purposes of illustrating the invention is of that type which discharges the clippings laterally and rearwardly through a large discharge opening 10 at one side of the housing.

The housing itself defines an inverted channel C of volute shape and having a smaller end 13 which constitutes the beginning of the volute channel in a direction of blade rotation, and from this small end, the channel is of ever-increasing cross-sectional area. An enlarged discharge chamber 14 is located at the discharge end of the channel, and a vertical chamber wall or baffle 15 is located at the juncture between the "starting" end 13 and the discharge end 10 of the volute channel.

The blade assembly B includes an inverted cone member 16 which is mounted on the shaft 7, and cutting blades 8 are secured around the periphery of the cone.

The action of the blade assembly B is such that it creates a suction effect on the grass being cut and pulls it up into the channel where it is then forcibly moved around the channel, through the discharge chamber, and out the discharge opening 10.

In accordance with the present invention, a water inlet opening 17 is formed in the top side 18 of the channel at this small end, because it has been found that at this area there is created a strong suction or intake current due to the rapidly rotating blade. As a result, any water that is directed at the top side of the housing and in the area of this opening will be immediately sucked through the opening by the action of the rotating blades. It is unnecessary to use a conduit or other connection for accurately directing the water through the opening, but instead it is sufficient to merely direct the stream of water in the general area of the opening, in order for the suction action to pull the water into the housing.

As the water enters the opening, it falls toward the top side 16a of the cone member 16 and blades 8 and is forcibly thrown against the entire interior surface of the channel by the rotating blade assembly. This forcible driving of the water acts to scour and completely purge the interior of the channel as well as the blade assembly of any clippings or other foreign matter.

By so locating the water inlet opening at the beginning of the volute channel and adjacent the discharge baffle, a very efficient water inlet opening and purging action have been provided for the housing and blade assembly.

The housing also includes a central deck 19 located above the inverted channel and on which the internal combustion engine 6 is mounted. This top deck is connected to the channel by means of a general vertical, annular wall 20, it being understood that the entire housing may be cast as an integral piece.

A water drain gutter 21 is located between the central deck and the channel, and more particularly, this drain gutter extends around the central portion of the housing formed by the wall 20 and is located adjacent the top side 18 of the channel. The highest point of the gutter is located adjacent the forward side of the mower and generally where the discharge chamber tangentially departs, as at 22, from the wall 20. The lowest section 23 of the circular gutter is located adjacent the opening 17 and is connected therewith by a radially extending gutter portion 24 which extends to and includes the opening 17. A short section 25 of the gutter inclines downwardly to the rear and connects the high end 22 of the gutter with the low end 23.

By means of this gutter construction, any water that would otherwise accumulate on the top of the mower drains by gravity through the water inlet opening, even though care is not exercised in directing the stream of water into the opening 17 during the cleansing operation.

In accordance with the present invention, a cleansing means has been provided which is simple to use and is particularly efficient in performing the functions for which it was designed.

Various modes of carrying out the invention are contemplated as being within the scope of the following claims particularly pointing out and distinctly claiming the subject matter which is regarded as the invention.

I claim:

1. A rotary lawn mower having a blade housing, a blade assembly mounted in said housing for rotation in a horizontal plane, power means external to said housing for rotating said blade assembly, said housing defining an inverted channel of volute shape and having a small end and then being of ever-increasing cross-sectional area in the direction of blade assembly rotation, said channel having an inclined top which terminates in a low area, and a water inlet opening in the top of said channel at said small end and adjacent said low area, whereby water is sucked through said opening by the air current in said channel and is forcibly thrown against the interior of said channel by said blade assembly.

2. The mower as defined in claim 1 including a central deck above said inverted channel, and a circular drain gutter located between said deck and said channel and adjacent the top side of the latter, said gutter being inclined to provide a high section and a low secton, said inlet opening being adjacent and in water receiving communication with said low section whereby water on said housing drains by gravity in said gutter and through said opening.

3. A rotary lawn mower having a blade housing, a blade mounted in said housing for rotation in a horizontal plane, power means external to said housing for rotating said blade to create an air current in said housing, said housing defining an inverted and generally circular channel of volute shape and having a small end and then being of ever-increasing cross-sectional area in the direction of blade rotation, said channel having a top side that inclines downwardly toward said small end, and a water inlet opening in the top of said channel at said small end whereby water is sucked through said opening by the air current in said channel and is forcibly thrown against the interior of said channel.

4. The mower as defined in claim 3 including a water drain gutter inclined around and adjacent the top side thereof, said gutter terminating in a low section, said inlet opening located in said low section whereby any water on said housing drains by gravity through said opening.

5. A rotary lawn mower having a blade housing defining an inverted channel of volute shape and having a small end and then being of ever-increasing cross-sectional area and terminating in a large discharge end, said channel having a top side which inclines downwardly toward said small end, and a water inlet opening in the top of said channel at said small end, whereby any water running down said inclined top will drain into said opening.

6. The mower as defined in claim 5 including an inclined drain gutter extending around and adjacent the top side and terminating in a low section around said inlet opening, whereby water on said housing drains into said gutter and through said opening.

References Cited in the file of this patent
UNITED STATES PATENTS

| | | |
|---|---|---|
| 2,719,396 | Morris et al. | Oct. 4, 1955 |
| 2,936,563 | Blume | May 17, 1960 |
| 2,973,614 | Horner et al. | Mar. 7, 1961 |
| 2,992,524 | Stabnau | July 18, 1961 |
| 3,049,854 | Denney | Aug. 21, 1962 |